O. ARNTZ.
SAW.
APPLICATION FILED OCT. 27, 1920.

1,434,421.

Patented Nov. 7, 1922.

Inventor:
Oswald Arntz

Patented Nov. 7, 1922.

1,434,421

UNITED STATES PATENT OFFICE.

OSWALD ARNTZ, OF REMSCHEID, GERMANY, ASSIGNOR TO THE FIRM: JOH. WILH. ARNTZ, OF REMSCHEID, GERMANY.

SAW.

Application filed October 27, 1920. Serial No. 419,996.

(GRANTED UNDER THE PROVISIONS OF THE ACT OF MARCH 3, 1921, 41 STAT. L., 1313.)

*To all whom it may concern:*

Be it known that I, OSWALD ARNTZ, a citizen of Germany, residing at Remscheid, Germany, have invented certain new and useful Improvements in Saws, (for which I have filed application in Germany Aug. 7, 1919, Patent No. 321,642), of which the following is a specification.

My invention refers to saws and more especially to saws with interchangeable teeth. Its particular object is an interchangeable tooth for saws which is attached to the blade proper by means of a tongue and groove arrangement in the same way as other teeth of this kind, this said tongue being however arranged, in contradistinction to the arrangement hitherto used, eccentrically in regard to the centre line of the tooth. The novel arrangement, whilst allowing of employing teeth of well-known configuration, offers a materially broader saw kerf and more effective looseness of cut than the customary arrangements in which the tongue is situated in the centre of the face or the back of the tooth respectively.

Sharpening the teeth alternately on one side and the other, as effected frequently with teeth of this kind in order to enhance their cutting effect and to facilitate their entering into the work-piece as well as the removal of the chips, is made unnecessary by the novel arrangement which thus results in a saving in labour expended on sharpening. As moreover the position of the corresponding groove in the blade proper is not affected by the novel arrangement, and the blade proper actually remains unchanged, my invention is applicable to all existing blades by simply changing the teeth.

In the drawings affixed to this specification and forming part thereof, a saw blade with interchangeable teeth embodying my invention, is illustrated by way of example.

In the drawings

Figure 1:
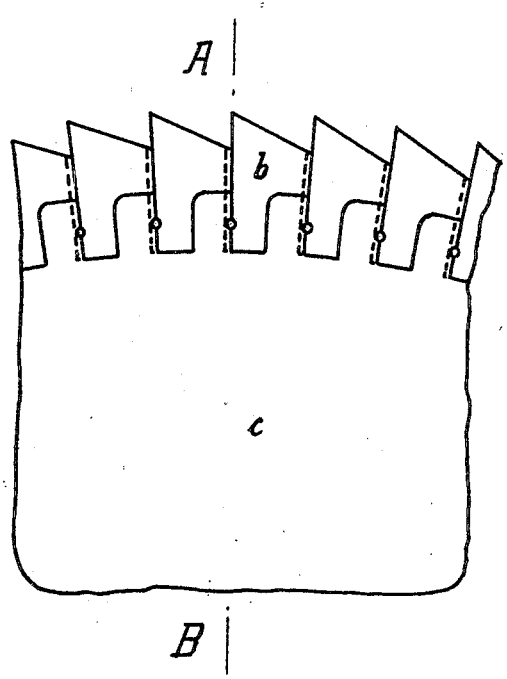
Fig. 1 is a side elevation, whilst
Figure 3:
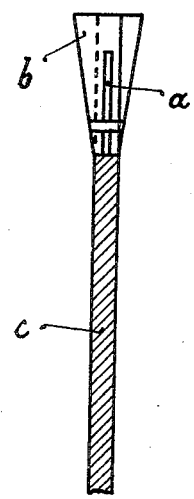
Fig. 3 is a section on the line A—B (Fig. 1).
Figure 2:
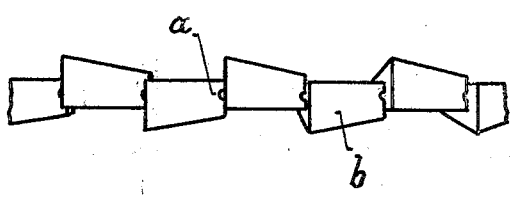
Fig. 2 is a plan.
Figure 4:
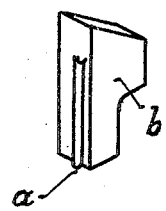
Fig. 4 is a perspective view of an interchangeable tooth.

As will be observed in Figs. 3 and 4 the tongue $a$ is arranged eccentrically on one side of the tooth $b$. When such a tooth is fitted on to the blade $c$ provided with the usual groove, the tooth is automatically brought into a one-sided position in regard to the blade proper, and projects to the right or left of the blade respectively according to whether the tongue of the tooth is provided on the right or the left hand side of the centre line of the tooth. After fitting in the teeth, they are ground so as to taper in the direction towards the centre of the blade, the grinding wheel, however, only acting upon every second tooth on each side. The illustration shows that by arranging the teeth eccentrically the saw blade attains a breadth of kerf which is larger by double the distance of the ribs from the centre line as compared to the kerf produced in the case of the ribs being arranged symmetrically, whilst not requiring an increase in the quantity of high speed tool steel used. Owing to their loose cut the novel teeth can be applied with advantage in all those cases where there is any risk of the blade jamming in the saw kerf, as, for instance, in the case of cutting off dead heads from steel castings, or in dividing bulky work pieces.

I claim:

1. An interchangeable saw tooth having a tongue arranged on an end face intermediate the centre line and a lateral edge of the tooth.

2. An interchangeable saw tooth having a tongue on one end face disposed eccentrically with regard to the centre line of the tooth and a groove on the other end face.

3. In a saw in combination, a blade, an indenture in said blade, a groove in said indenture, a tooth inserted in said indenture and a tongue on said tooth arranged intermediate the centre line and a lateral edge of said tooth, inserted in said groove.

4. In a saw in combination, a blade having indentures distributed over its circumference and a groove in each indenture, a tooth inserted in each indenture, a tongue on one end face and a groove on the other end face of said tooth, said tongue being arranged eccentrically with regard to the centre line of said tooth, the tongue of each tooth being inserted in the groove of the respective indenture and in the groove of the adjoining tooth.

In testimony whereof I affix my signature.

OSWALD ARNTZ.